(12) United States Patent
Baran

(10) Patent No.: US 7,392,853 B2
(45) Date of Patent: Jul. 1, 2008

(54) EDGING AND TRENCHING BLADE

(76) Inventor: Gregory Baran, 4751 E. High St., Mantua, OH (US) 44255

( * ) Notice: Subject to any disclaimer, the term of this patent is extended or adjusted under 35 U.S.C. 154(b) by 203 days.

(21) Appl. No.: 11/407,830

(22) Filed: Apr. 19, 2006

(65) Prior Publication Data

US 2007/0246260 A1    Oct. 25, 2007

(51) Int. Cl.
*A01B 33/00* (2006.01)

(52) U.S. Cl. ........................ 172/41; 172/540

(58) Field of Classification Search ............... 172/15, 172/14, 17, 185, 42, 123, 41, 549, 125, 540, 172/548; 30/348, 351, 355; D15/17, 28; 56/256, 255, 295, 12.7, 16.9, 17.1; 175/351, 175/354, 356; D8/8
See application file for complete search history.

(56) References Cited

U.S. PATENT DOCUMENTS

| | | | |
|---|---|---|---|
| 2,312,569 A | | 3/1943 | Maga |
| 2,571,455 A | | 10/1951 | Keiper |
| 2,908,337 A | * | 10/1959 | Surprise et al. ............. 172/549 |
| 3,022,621 A | * | 2/1962 | Zavarella ...................... 56/295 |
| 3,162,990 A | * | 12/1964 | Cook ............................ 56/295 |
| 3,214,896 A | * | 11/1965 | Watkins et al. ................ 56/295 |
| 3,358,431 A | | 12/1967 | Fitzgerald, Jr. |
| 3,482,380 A | * | 12/1969 | Stair ............................. 56/295 |
| 3,538,692 A | * | 11/1970 | Cope et al. ................... 56/295 |
| 3,760,884 A | * | 9/1973 | Webster et al. .............. 172/555 |
| 3,998,037 A | * | 12/1976 | Deans et al. .................. 56/295 |
| 4,072,195 A | | 2/1978 | Carlson |
| 4,269,020 A | * | 5/1981 | Wolf ............................ 56/295 |
| 4,297,831 A | * | 11/1981 | Pioch .......................... 56/295 |
| 4,421,176 A | * | 12/1983 | Tuggle et al. ................ 172/41 |
| 4,578,938 A | * | 4/1986 | Genesco ...................... 56/295 |
| 4,645,011 A | | 2/1987 | Feikema et al. |
| 4,653,590 A | | 3/1987 | Shank |
| 4,881,438 A | | 11/1989 | Pinney |

(Continued)

OTHER PUBLICATIONS

Plano Power Equipment Online Store—Edger Blades, http://www.planopower.com/store/edger_blades.shtml, printed from website Jan. 16, 2006, 5 pages.

(Continued)

*Primary Examiner*—Arpád Fábián-Kovács
(74) *Attorney, Agent, or Firm*—Pearen & Gordon LLP

(57) ABSTRACT

The invention features an elongated blade having at least one first tooth near a first end extending in one direction and at least one second tooth near a second end extending in the opposite direction. The body of the blade can be a generally rectangular plate. There can be at least two first and second teeth. The blade can include four corners, wherein at the first end the first teeth are formed in the first edge and at the second end the second teeth are formed in the second edge. Edges of the blade can be formed without teeth near two corners and can be sharpened or not. The teeth may extend different distances from the blade. The blade cuts into a surface. In one application, the blade is used for edging or trenching and is rotated generally vertically so as to penetrate the ground and any material on or in the ground such as grass, sod, turf, leaves, thatch and the like. The invention also features devices used to power a shaft on which one or more of the blades are mounted, such as edging or trenching machines.

29 Claims, 4 Drawing Sheets

U.S. PATENT DOCUMENTS

| | | | |
|---|---|---|---|
| 5,056,605 A * | 10/1991 | Bond et al. | 172/111 |
| 5,197,268 A * | 3/1993 | Barrera | 56/255 |
| 5,299,647 A * | 4/1994 | Mudd et al. | 172/555 |
| 5,540,286 A * | 7/1996 | Helmig | 172/15 |
| 5,845,405 A * | 12/1998 | Rosdahl | 30/276 |
| 5,899,053 A * | 5/1999 | Roth | 56/295 |
| 6,062,318 A | 5/2000 | Andrews | |
| 6,289,660 B1 | 9/2001 | Martinez | |
| 6,293,349 B1 | 9/2001 | Marshall et al. | |
| 6,367,561 B1 * | 4/2002 | Firdaus | 172/60 |
| 6,446,346 B1 * | 9/2002 | Castleman | 30/276 |
| 6,464,015 B1 | 10/2002 | Jones | |
| 6,487,840 B1 | 12/2002 | Turner et al. | |
| 6,523,618 B2 * | 2/2003 | Firdaus | 172/540 |
| 6,640,449 B1 | 11/2003 | Hoffmann et al. | |
| 6,675,569 B2 * | 1/2004 | Mannon et al. | 56/295 |
| 6,688,095 B2 | 2/2004 | Wadzinski | |
| 6,739,403 B2 * | 5/2004 | Firdaus | 172/540 |
| 6,857,481 B1 | 2/2005 | Hayes | |
| 6,874,581 B1 | 4/2005 | Porter et al. | |
| 6,935,095 B1 | 8/2005 | Sluder | |

OTHER PUBLICATIONS

The Re-Edger—Landscaping Bed Split Drive Stick Edger Blade Attachment, http://www.reedger.com/, printed from website Feb. 7, 2006, 1 page.

The Re-Edger—Landscaping Bed Split Drive Stick Edger Blade Attachment—Products, http://www.reedger.com/products.htm, printed from website Feb. 7, 2006, 2 pages.

Mantis Garden Tools, http://www.mantisgardentools.com/accessories.asp, printed from website Jan. 30, 2006, 1 page.

http://www.troybilt.com/webapp/wcs/stores/servlet/pics/TroyBilt/25A-554C766_1j.jpg, printed Jan. 25, 2006, 1 page.

International Search Report and Written Opinion of the International Searching Authority issued in PCT/US2007/64888 dated Nov. 14, 2007.

* cited by examiner

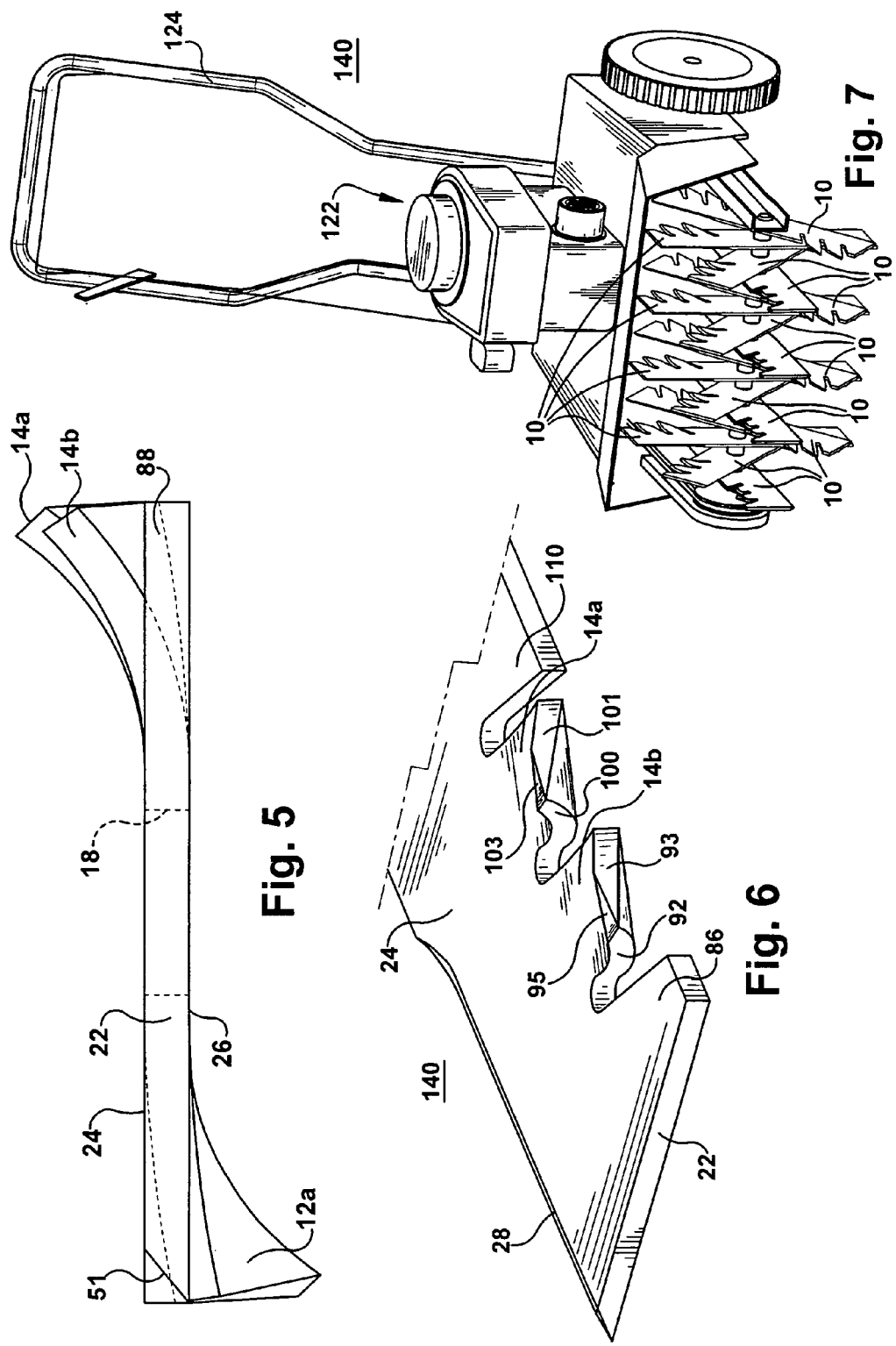

EDGING AND TRENCHING BLADE

FIELD OF THE INVENTION

The present invention is directed to blades for cutting into surfaces and, in particular, to trenching and edging blades for cutting into the ground.

BACKGROUND OF THE INVENTION

In the landscaping business a common task is to edge around landscaping, sidewalks or driveways. This can be carried out by a machine known as an edger having a blade rotated vertically by a motor driven shaft on which it is mounted. The blade used in conventional edgers is usually rectangular bar stock that can have sharpened edges near each end. One limitation is that the rotating tip of the blade makes a thin cut into the grass having a width of the blade. This is followed with cleanup by hand to remove the grass that overhangs the cut. Each blade can have multiple sections (e.g., four perpendicular rectangular cutting sections rather than just a rectangular piece of bar stock). One problem with existing edging blades is that the soil or grass is thrown up into a safety cover over the blade, which tends to lead to clogging.

U.S. Pat. No. 6,487,840 discloses a mulching and shredding blade used on lawnmowers intended to avoid having to collect grass clippings, leaves and other debris from the lawn after mowing. The blade is generally rectangular and has teeth on opposing edges near each end that have an upward slope. The blade is rotated horizontally and designed so that the upwardly sloped teeth help create an area of low pressure for keeping the clippings and leaves up near the rotating blade. The blade has a transition section including a leading cutting edge that is offset upwardly relative to a leading cutting edge of an outboard section that is located closer to the end of the blade than the transition section.

U.S. Pat. No. 6,688,095 discloses a rectangular lawnmower blade designed for horizontal rotation having upstanding teeth on the edges of the blade near each end.

U.S. Pat. No. 6,640,449 discloses a device including a cutting blade for a trimmer rotating horizontally above the ground, including two ends that are bent toward the ground for cutting and chopping of cut material such as grass, weeds, reeds, bushes and thin trees.

U.S. Pat. No. 2,312,569 discloses a lawn edger having a circular blade with teeth that alternate around the blade in the pattern: left-side tooth, intermediate tooth and right-side tooth. Additional circular blades are also used.

U.S. Pat. No. 3,358,431 discloses a rectangular blade for a lawn edger having scoops projecting toward the same side. U.S. Pat. No. 6,464,015 discloses a lawn edger including a circular blade having ribs protruding from the same side of the blade.

DISCLOSURE OF THE INVENTION

The present invention features an elongated blade including teeth near opposing ends of the blade. The blade has a rotational axis and is adapted to penetrate an organic or inorganic surface. For example, the blade rotates generally vertically and penetrates the ground in the particular applications of edging and trenching. Reference to penetrating the ground as used in this disclosure means cutting through material on the surface of the ground, if any, into underlying soil. Material on the surface of the ground includes grass, sod, turf, leaves, thatch and the like. The axis extends from a first side of the blade in a first direction and from a second side of the blade in a second direction that is opposite to the first direction. At least one first tooth near the first end extends in the second direction and at least one second tooth near the second end extends in the first direction.

More specifically, the blade is a generally rectangular shaped thin plate (e.g., ⅛ inch thick) including first and second ends. The first and second ends are spaced by a length of the blade (e.g., about 8 inches or more). The first and second surfaces extend between the first and second ends. First and second edges extend along the length between the first and second surfaces (at a spacing between the edges or blade width of about 2 inches or more). The axis of rotation of the blade extends outwardly relative to the first surface in the first direction and extends outwardly relative to the second surface in a second direction that is opposite to the first direction. At least one first tooth is located near the first end, comprised of a tab cut from the first edge of the plate bent to extend outwardly in the second axis direction. At least one second tooth is located near the second end, comprised of a tab cut from the second edge of the plate bent to extend outwardly in the first axis direction. Reference to the teeth extending in the first or second direction should not be construed to limit the invention to a precise angle of the teeth or alignment with the axis, but rather generally describes the position of the teeth on one side of the blade relative to the other side of the blade.

The blade includes a first corner formed by intersection of the first end and first edge, a second corner formed by intersection of the first end and second edge, a third corner formed by intersection of the second end and first edge, and a fourth corner formed by intersection of the second end and second edge. The first tooth is disposed near the first corner and the second tooth is disposed near the fourth corner.

In one aspect of the invention the inventive blade includes multiple first and second teeth. The teeth can be the same or different. For example, one first tooth could be bent, sloped, sized, spaced and shaped the same or different than another first tooth. It is desirable for the corresponding first and second teeth to be the same as each other to balance the blade.

The first and second teeth can both comprise an outer tooth and an inner tooth that are spaced from the blade by different distances relative to the rotational axis. Each outer tooth includes a peripheral portion spaced a maximum outer distance from an adjacent first or second surface along the axis. Each inner tooth includes a peripheral portion spaced a maximum inner distance from the adjacent surface along the axis. The outer distance is greater than the inner distance.

The first end and second edge extend at about 90 degrees relative to each other at the second corner. Likewise, the second end and first edge extend at about 90 degrees relative to each other at the third corner. The second edge is without teeth near the second corner and the first edge is without teeth near the third corner. In a particular aspect of the invention, the second edge is sharpened near the second corner and the first edge is sharpened near the third corner.

In operation of the blade, the second edge enters the ground progressively nearer to the second corner until the second corner enters the ground. The second edge may be sharpened or may be a flat edge of the rectangular plate. Continued rotation of the blade causes the first teeth to enter the ground next. A corner tooth at the first corner enters the ground first. The first teeth extend in the second direction. If the first teeth include the inner and outer teeth spaced different distances from the second surface, the inner first tooth penetrates the ground at a peripheral portion up to an extent of the inner distance. Then, the outer first tooth enters the ground at a peripheral portion up to an extent of the greater outer distance.

Because the teeth are formed of bent tabs of the thin rectangular plate, only a thin surface of each of the inner and outer first teeth, having a thickness of the plate, along with short curved portions of the teeth, are exposed to the ground. This minimizes resistance of penetration of the blade into the ground while resulting in a wider cut compared to typical rectangular-plate edging blades.

As the blade continues generally vertical, clockwise rotation, the first edge enters the ground progressively nearer to the third corner and then the third corner enters the ground. The third corner enters the ground approximately 180° from where the second corner enters the ground. The first edge may be sharpened or may be a flat edge of the rectangular plate near the second end. Continued clockwise rotation of the blade causes the second teeth to enter the ground next. A corner tooth at the fourth corner enters the ground first. The corner tooth enters the ground approximately 180° from where the other corner tooth enters the ground. The second teeth extend in the first direction. If the second teeth include the inner and outer teeth, the inner second tooth enters the ground first at a peripheral surface up to an extent of the inner distance. Then, the outer second tooth enters the ground at a peripheral surface up to an extent of the greater outer distance. Because the teeth are formed of bent tabs of the plate, only a thin surface of each of the inner and outer teeth, having a thickness of the plate, along with short curved portions of the teeth, are exposed to the ground. This minimizes resistance of penetration of the blade into the ground while resulting in a wider cut compared to typical rectangular-plate edging blades. Rotation of the blade in this manner forms a trench in the ground having a width equal to the distance between the outer peripheral surfaces of the outer first and second teeth.

The invention features an edging machine including a motor driven rotatable drive shaft and the inventive blade mounted to the drive shaft at the rotational axis. The edging machine is used to penetrate the ground upon rotation of the blade by the drive shaft. The edging machine includes a body, a motor attached to the body, a handle at an upper end portion of the body, the drive shaft mounted to a lower end portion of the body and powered by the motor, and a protective cover fastened to a lower end portion of the body shielding the operator from the blade.

The blade may be formed of material having suitable strength and impact resistance such as metal (e.g., steel). The first teeth are formed by cutting tabs from the first edge near the first end of the blade. The tabs are bent in the second direction. The second teeth are formed by cutting tabs from the second edge near the second end of the blade. The tabs are bent in the first direction.

The inventive blade is advantageously suitable as an edging or trenching blade for edging or cutting a trench into the ground and through grass, sod, turf, leaves, thatch and the like located on or in the ground. The blade can be used for edging along objects including landscaping, sidewalks or driveways, or for trenching, for example, cutting trenches for laying wire or conduit below the ground. In addition, multiple blades can be mounted to a shaft, which facilitates use in a machine for making wide cuts or tilling of the ground.

Each inventive blade is able to cut a wider trench into the ground than current edging blades that are formed of a rectangular plate without teeth. The inventive blade cuts through grass cleaner than the typical rectangular-plate edging blade. In addition, the inventive teeth, extending to either side near each end of the blade, prevent a common problem with rectangular-plate edging blades whereby the blade cover is clogged with grass, leaves or other matter thrown upwardly by the blade. The inventive teeth enable the blade to throw material to the sides of the blade rather than upwardly into the cover. This avoids clogging of the cover and jamming of the blade and a more efficient edging or trenching operation compared to conventional blades.

Many additional features, advantages and a fuller understanding of the invention will be had from the accompanying drawings and the Detailed Description that follows. It should be understood that the above Disclosure of the Invention describes the invention in broad terms while the following Detailed Description describes the invention more narrowly and presents specific embodiments that should not be construed as necessary limitations of the broad invention as defined in the claims.

BRIEF DESCRIPTION OF THE DRAWINGS

FIG. 5 is an end view as seen along the plane designated by lines and arrows 5-5 in FIG. 3;

FIG. 6 is a partial perspective view of the second end of the blade of FIG. 2;

FIG. 7 is a perspective view of a machine using multiple blades of the invention.

DETAILED DESCRIPTION OF THE INVENTION

Figures 1, 2:
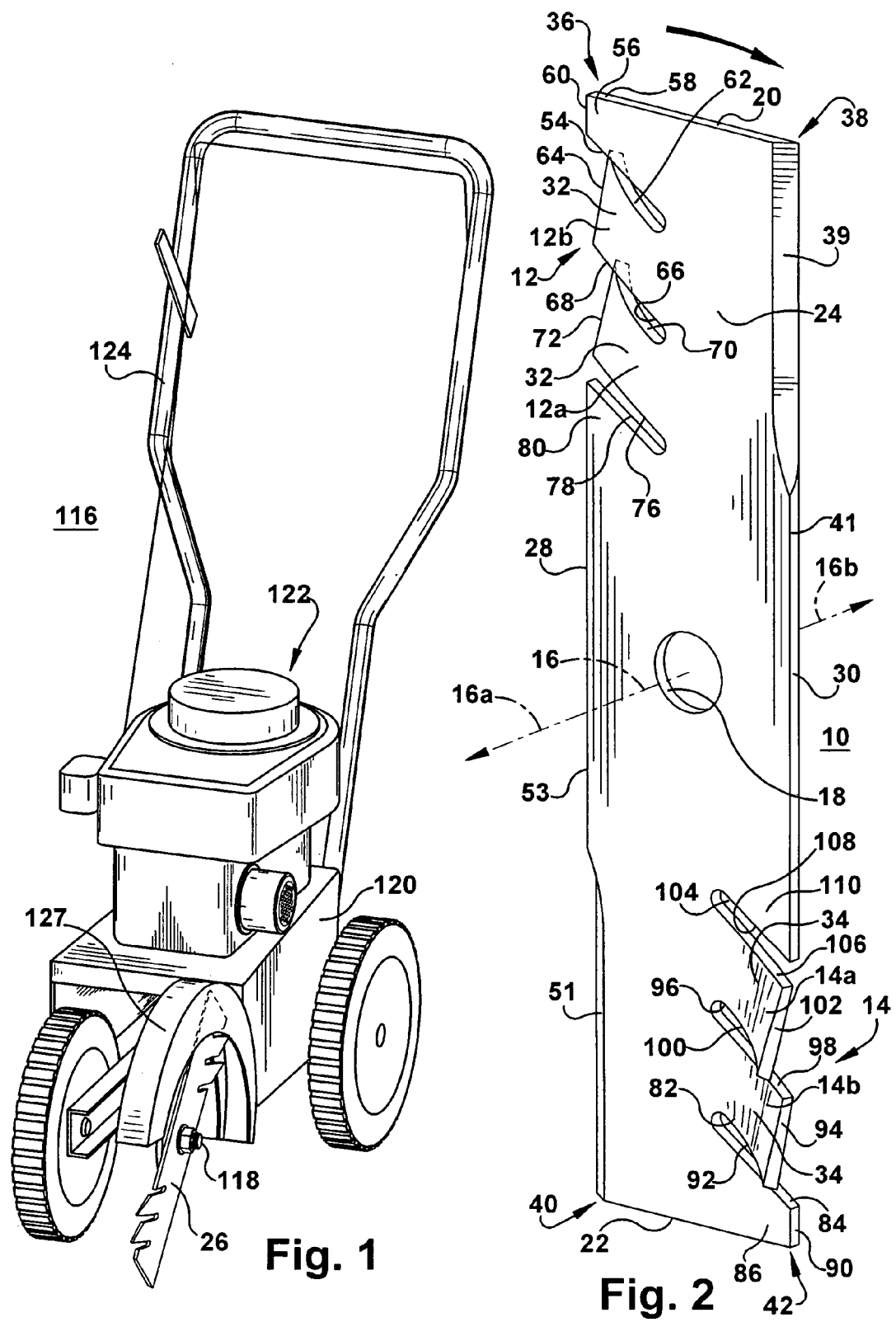
FIG. 1 is a perspective view of an edging or trenching machine using a blade constructed in accordance with the present invention.
FIG. 2 is a perspective view of the inventive blade shown in FIG. 1.
Figure 4:
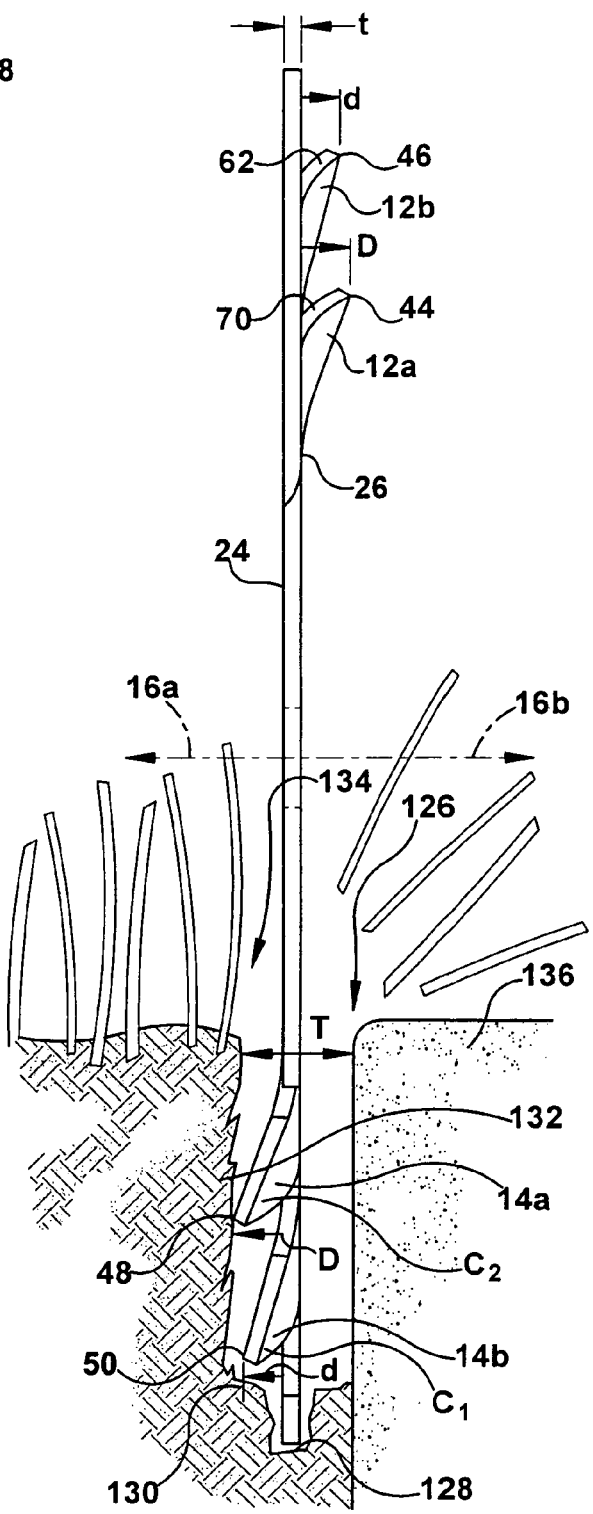
FIG. 4 is a front elevational view of the blade shown in FIG. 1, penetrating the ground.
Figure 8:
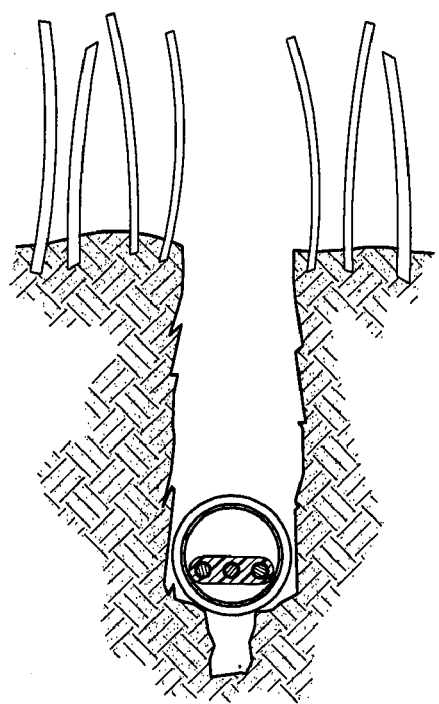
FIGS. 8-10 are cross-sectional views showing laying of electrical wire inside a conduit, laying of cable or pet fence wire, and laying of pipe, respectively, in a trench made using the inventive blade.
Figure 9:
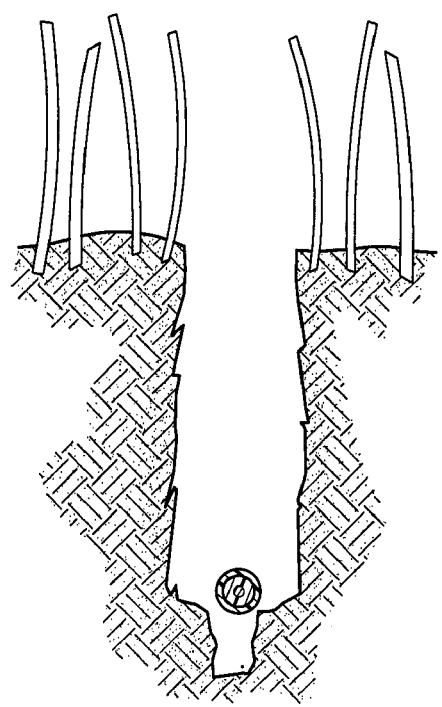
Figure 10:
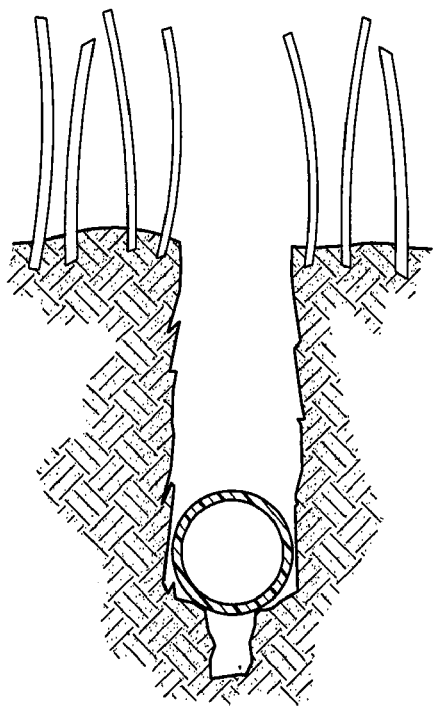

Referring to the drawings, the present invention features a generally rectangular shaped blade 10 including first and second sets of teeth 12, 14 near opposing ends of the blade. The blade has a rotational axis 16 and is adapted to penetrate a surface to be cut. The axis extends in a first axis direction 16a (e.g., outwardly to the left from the left side of the blade) and in a second axis direction 16b (e.g., outwardly to the right from the right side of the blade). The first and second axis directions 16a, 16b are opposite, i.e., disposed 180° apart from each other. Referring to FIGS. 2 and 4, the first teeth 12 extend to the right and are referred to as right teeth and the second teeth 14 extend to the left and are referred to as left teeth. A central opening 18 is formed in the blade having the axis of rotation at its center. The opening can be circular, square or other suitable shape. The blade may be formed of any suitably hard and impact resistant material such as metal (e.g., steel).

One of ordinary skill in the art will realize that relative terms such as right, left, up, down, top, and bottom, used in this disclosure are dependant on the orientation of the blade and not intended to be used in an absolute sense. These terms are used to improve understanding and should not be used to limit the present invention. In addition, the inventive blade can be designed to be a mirror image of the blade shown in the drawings, in which case the first teeth 12 would extend in the left axis direction and the second teeth 14 would extend in the right axis direction. In addition, if the blade is intended to be rotated counterclockwise, the configuration of the blade would change appropriately (e.g., the blade can be flipped 180° from its orientation shown in FIGS. 2 and 3 about a central axis extending along the length of the blade).

More specifically, the blade is a generally rectangular shaped thin plate including first and second ends 20, 22 that are spaced by a length of the blade. First and second surfaces 24, 26 extend between the first and second ends. First and second edges 28, 30 extend along the length between the first and second surfaces. The axis 16 extends outwardly to the right relative to the second surface (i.e., in the right axis direction 16b) and outwardly to the left relative to the first surface (i.e., in the left axis direction 16a). The right teeth 12 are located near the first end 20, comprised of tabs 32 cut from the first edge 28 of the plate, bent to extend outwardly in the right axis direction 16b. The left teeth 14 are located near the second end 22, comprised of tabs 34 cut from the second edge 30 of the plate, bent to extend outwardly in the left axis direction 16a.

The blade includes a first corner 36 formed by intersection of the first end 20 and first edge 28, a second corner 38 formed by intersection of the first end 20 and second edge 30, a third corner 40 formed by intersection of the second end 22 and first edge 28, and a fourth corner 42 formed by intersection of the second end 22 and second edge 30. The right teeth 12 are disposed near the first corner 36 and the left teeth 14 are disposed near the fourth corner 42.

The first end 20 and first edge 28 extend at about 90 degrees relative to each other to form the first corner. The first end 20 and second edge 30 extend at about 90 degrees relative to each other to form the second corner 38. The second end 22 and first edge 28 extend at about 90 degrees relative to each other to form the third corner 40. The second end 22 and second edge 30 extend at about 90 degrees relative to each other to form the fourth corner 42. The second edge 30 is without teeth near the second corner 38 and the first edge 28 is without teeth near the third corner 40. In a particular aspect of the invention, the second edge 30 is sharpened near the second corner 38 and the first edge 28 is sharpened near the third corner 40.

In one aspect of the invention the right and left teeth 12, 14 both comprise an outer tooth and an inner tooth that are spaced from an adjacent surface of the blade by different distances relative to the rotational axis. An outer right tooth 12a includes a peripheral portion 44 (FIG. 4) spaced a maximum outer distance D from the second surface 26 in the right axis direction 16b. An inner right tooth 12b includes a peripheral portion 46 spaced a maximum inner distance d from the second surface 26 in the right axis direction 16b. The outer left tooth 14a includes a peripheral portion 48 spaced the outer distance D from the first surface 24 in the left axis direction 16a. The inner left tooth 14b includes a peripheral portion 50 spaced the inner distance d from the first surface 24 in the left axis direction 16a. The outer distance D is greater than the inner distance d. The difference between the inner distance d and outer distance D is, for example, ⅛ inch, and can be changed as desired.

Figure 3:
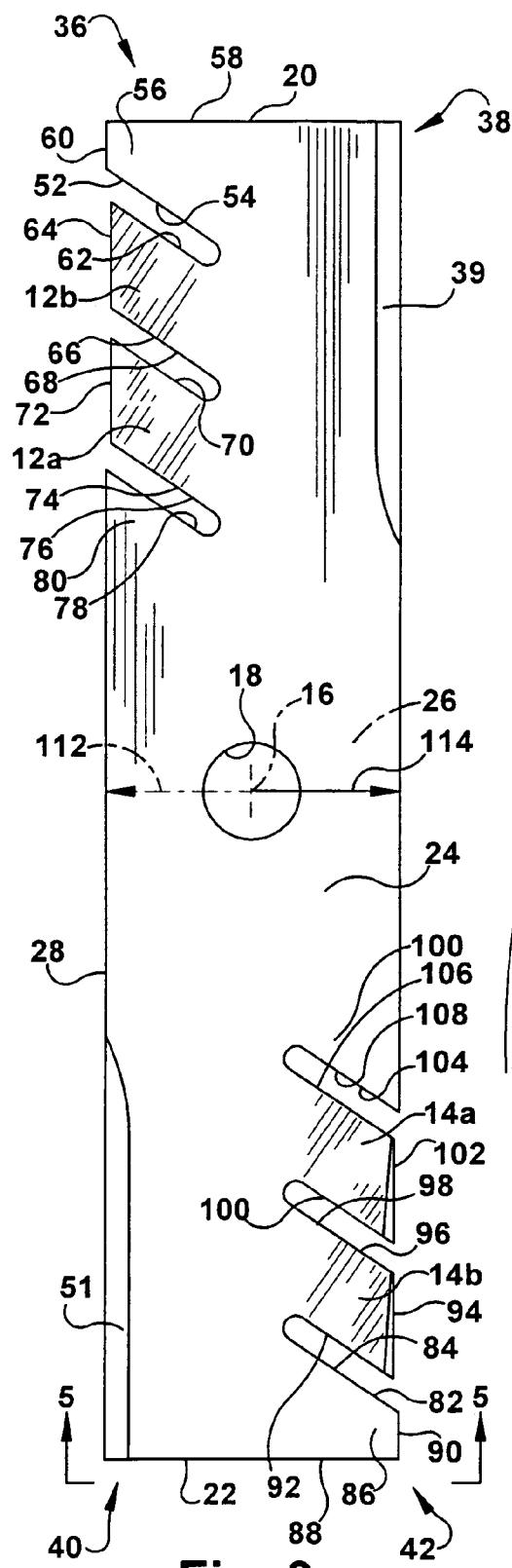
FIG. 3 is a left side elevational view of the inventive blade shown in FIG. 2.

Referring to FIGS. 2 and 3, the first teeth 12 are formed by cutting the tabs 32 from the first edge 28 near the first end 20 of the blade. The tabs are bent to the right of the blade. In particular, a first cut 52 is made along an angle to the first edge 28 forming a trailing surface 54 of a corner tooth 56 at the first corner 36 of the blade. A leading surface 58 of the corner tooth 56 forms a portion of the first corner 36 of the blade. The corner tooth 56 has an outer edge 60. The first cut 52 also forms a leading surface 62 of the inner right tooth 12b. The inner right tooth 12b has an outer edge 64. A second cut 66 is made, spaced closer to the axis 16, along an angle to the first edge, forming a trailing surface 68 of the inner right tooth 12b. The inner right tooth 12b is bent in the right axis direction 16b to position its peripheral surface by the inner peripheral distance d. The second cut also forms a leading surface 70 of the outer right tooth 12a. The outer right tooth 12a has an outer edge 72. A third cut 74 is made, spaced closer to the axis 16, along an angle to the first edge, forming a trailing surface 76 of the outer right tooth 12a. The outer tooth is bent in the right axis direction 16b to position its peripheral surface by the outer distance D. The third cut also forms a leading surface 78 of a partial first tooth 80.

The second teeth 14 are formed by cutting the tabs 34 from the second edge 30 near the second end 22 of the blade. The tabs are bent to the left of the blade. In particular, a first cut 82 is made along an angle to the second edge 30 forming a trailing surface 84 of a corner tooth 86 at the fourth corner 42 of the blade. A leading surface 88 of the corner tooth 86 forms a portion of the fourth corner 42 of the blade. The corner tooth 86 has an outer edge 90. The first cut 82 also forms a leading surface 92 of the inner left tooth 14b. The inner left tooth 14b has an outer edge 94. A second cut 96 is made, spaced closer to the axis 16, along an angle to the second edge, forming a trailing surface 98 of the inner left tooth 14b. The inner left tooth 14b is bent in the left axis direction 16a to position its peripheral surface by the inner distance d. The second cut 96 also forms a leading surface 100 of the outer left tooth 14a. The outer left tooth has an outer edge 102. A third cut 104 is made, spaced closer to the axis 16, along an angle to the second edge, forming a trailing surface 106 of the outer left tooth 14a. The outer left tooth 14a is bent in the left axis direction 16a to position its peripheral surface by the outer distance D. The third cut also forms a leading surface 108 of a partial second tooth 110.

The angle at which the tabs 32, 34 are cut relative to the edges can be varied from 30 to 90 degrees and, in particular, is about 45 degrees.

The inner and outer teeth can be sharpened or unsharpened. The teeth are unsharpened in FIG. 2. Referring to FIG. 6, the left teeth 14b, 14a are sharpened near the leading surfaces 92 and 100, respectively. This can be achieved by filing down surrounding surfaces such as the outer edges 94, 102 and the first surface 24, providing surfaces 93 and 95 on the inner left tooth 14b and surfaces 101, 103 on the outer left tooth 14a that form sharp edges.

Referring to FIG. 3, a first transverse direction 112 extends from the axis 16 toward the first edge along the second surface 26. A second transverse direction 114 extends from the axis 16 toward the second edge along the first surface 24. The first teeth 12 have a positive slope or pitch in the first transverse direction 112 relative to the second surface 26, while the second teeth 14 have a positive slope or pitch in the second transverse direction 114 relative to the first surface 24. It might be possible for the teeth to have a negative slope or pitch instead of the positive slope or pitch that is described.

As examples of variations in design of the inventive blade, fewer or more teeth can be used; the teeth can extend at different angles and slopes; and the teeth can have other shapes and sizes. The teeth can be bent as shown or bent and twisted toward the axis 16 or toward the adjacent end 20 or 22. The blade may have a different shape besides a rectangle. For example, the blade can be in the shape of four elongated blade sections that form an X-shape. The blade can have a central generally circular shape near the central axis and opposing rectangular sections extending from either end of the circular portion toward the first and second ends, respectively.

In operation of the blade, the second edge 30 enters the ground progressively nearer to the second corner 38 until the second corner enters the ground. The second edge may be sharpened at 39 near the first end or the entire edge may be a flat edge 41. Continued rotation of the blade causes the right teeth 12 to enter the ground next. The first corner tooth 56 at the first corner 36 enters the ground first making a cut along the plane of the blade. The inner right tooth 12*b* penetrates the ground up to an extent of the peripheral portion 46 at the inner distance d, making an inner cut on the right side offset from the plane of the blade. The outer right tooth 12*a* enters the ground up to an extent of the peripheral portion 44 at the greater outer distance D, making an outer cut on the right side offset more than the inner cut.

As the blade continues generally vertical clockwise rotation, the first edge 28 enters the ground progressively nearer to the third corner 40 until the third corner 40 enters the ground. The third corner 40 enters the ground approximately 180° from where the second corner 38 enters the ground. The first edge may be sharpened near the second end at 51 or the entire edge may be a flat edge 53. Continued clockwise rotation of the blade causes the left teeth 14 to enter the ground next. The corner tooth 86 at the fourth corner 42 enters the ground first, making a cut along the plane of the blade. The corner tooth 86 enters the ground approximately 180° from where the corner tooth 56 enters the ground. If the left teeth 14 include the inner and outer teeth, the inner left tooth 14*b* enters the ground first up to an extent of the peripheral portion located at the inner distance d, making an inner cut on the left side offset from the plane of the blade. The outer left tooth 14*a* enters the ground up to an extent of the peripheral portion at the outer distance D, making an outer cut on the left side offset more than the inner cut.

Referring to FIGS. 4 and 6, because the teeth are formed of bent tabs of the plate, only a thin surface of each of the inner and outer teeth, having a thickness of the plate (e.g., leading surfaces 92 and 100), along with short curved surfaces of the teeth (e.g., C1, C2), are exposed to the ground. This minimizes resistance of penetration of the blade into the ground while resulting in a wider cut compared to typical rectangular-plate edging blades. The feature of the corner teeth 56, 86 and the second and third corners 38, 40 being in same plane, is advantageous in that the blade enters the ground with low resistance. The second corner and corner tooth 56 enter the ground before the right offset teeth 12*a,b* while the third corner and corner tooth 86 enter the ground before the left offset teeth 14*a,b*. This accommodates the forces imposed by the offset teeth and balances the blade. This also serves to efficiently cut into the ground and grass, for example, because the cuts are made sequentially with an edge and teeth having relatively narrow widths. Moreover, the right teeth throw the soil and material on the ground, such as grass, to the right side of the blade while the left teeth throw the soil and material to the left side of the blade, which avoids clogging of the cover of the edging or trenching machine.

The invention features an edging or trenching machine 116 including a motor driven rotatable drive shaft 118. The central opening 18 of the inventive blade receives the drive shaft. The blade may be mounted to the drive shaft in a conventional manner, for example, bolting of the blade onto the shaft. The edging machine is used to penetrate the ground upon rotation of the blade by the drive shaft. The edging machine includes a body 120, a motor 122 attached to the body, a handle 124 at an upper end portion of the body, the drive shaft 118 mounted to a lower end portion of the body and powered by the motor, and a protective cover 127 fastened to a lower end portion of the body shielding the operator from the blade.

The blade is able to cut a wider trench in the ground than current edging blades that are formed of only a rectangular plate without teeth. The inventive blade cuts through grass cleaner than the typical rectangular-plate edging blade. In the edging or trenching application, the blade is rotated generally vertically and perpendicular to the ground. For example, the particular blade shown is rotated clockwise as shown by the arrow in FIG. 2 (the top of the blade rotates out of the page in FIG. 4). Rotation of the blade in this manner forms a trench 126 in the ground having a width T approximating the sum of the two outer distances D between the outer peripheral portions of the outer first and second teeth 12*a*, 14*a*, and the thickness t of the blade. The corners and corner teeth of the blade form central trench portion 128; the inner left tooth 14*b* forms the inner left trench portion 130 in the ground; the outer left tooth 14*a* forms the outer left trench portion 132 in the ground. The teeth 12 form similar trenches in the ground of the other side of the blade. Edging with the inventive blade is believed to produce a clean edge 134 along sidewalks, driveways, landscaping or other objects 136, resulting in less clean-up afterwards.

As shown in FIG. 7, where like reference numerals represent like parts throughout the views of this disclosure, a series of the inventive blades 10 can be used to cut or till wide sections of the ground using machine 140. The multiple blades are spaced and secured on the shaft in any suitable manner. For example, the blades could include flat surfaces forming part of the openings (e.g., square openings). The shaft may include sections with flats, keys or the like, that engage the flats of each opening. Collars can be mounted to the blades and set screws may extend from the collar to secure each blade to the shaft. An advantage of using multiple blades of the invention is that the ground is penetrated or tilled efficiently in view of the thin surfaces of the blades that are exposed to the ground. This might permit use of motors at reduced horsepower to achieve the performance of conventional rototillers or enable more efficient cutting with machines at current horsepower.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. An elongated blade comprising:
    first and second ends spaced by a length of the blade, first and second surfaces extending between said first and second ends, and first and second edges extending along said length between said first and second surfaces, wherein an axis of rotation of said blade extends outwardly from said first surface in a first direction and extends outwardly from said second surface in a second direction that is opposite to said first direction;
    a hole formed in said first surface and said second surface around the axis;
    wherein said blade includes an unbent corner formed by intersection of said first end and said first edge and an unbent corner formed by intersection of said second end and said second edge,
    at least one first tooth disposed along said first edge extending from the second surface in the second direction; and
    at least one second tooth disposed along said second edge extending from the first surface in the first direction.

2. The blade of claim 1 comprising inner and outer said first teeth and said second teeth, wherein each said outer tooth includes a peripheral portion spaced from an adjacent one of said first surface and said second surface along said axis by a distance D, each said inner tooth includes a peripheral portion spaced from an adjacent one of said first surface and said second surface along said axis by a distance d, said distance D being greater than said distance d.

3. The blade of claim 2 wherein said first teeth are comprised of tabs formed by cutting three notches from said first edge bent in the second direction and said second teeth are comprised of tabs formed by cutting three notches from said second edge bent in the first direction.

4. An edging machine comprising a body, a motor attached to said body, a handle at an upper end portion of said body, a rotatable generally horizontal drive shaft mounted to a lower end portion of said body and powered by said motor, said blade of claim 1 fastened to said drive shaft, wherein said drive shaft is received in said hole of said blade, and a protective cover fastened to a lower end portion of said body shielding the operator from said blade, wherein said blade is adapted to form a trench in the ground while rotated by said drive shaft.

5. A device including a motor driven rotatable drive shaft and said blade of claim 1 fastened to said drive shaft, wherein said drive shaft is received in said hole of said blade, wherein said blade is adapted to form a trench in the ground while rotated by said drive shaft.

6. A device including a motor driven rotatable drive shaft and a plurality of said blades of claim 1 fastened to said drive shaft, wherein said drive shaft is received in said holes of said blades, wherein said blades are adapted to penetrate the ground while rotated by said drive shaft.

7. An elongated blade comprising:
first and second ends spaced by a length of the blade, first and second surfaces extending between said first and second ends, and first and second edges extending along said length between said first and second surfaces, wherein an axis of rotation of said blade extends outwardly from said first surface in a first direction and extends outwardly from said second surface in a second direction that is opposite to said first direction;
a hole formed in said first surface and said second surface around the axis;
wherein said blade includes a first corner formed by intersection of said first end and said first edge, a second corner formed by intersection of said first end and said second edge, a third corner formed by intersection of said second end and said first edge, and a fourth corner formed by intersection of said second end and said second edge,
at least two first teeth disposed along said first edge extending from the second surface in the second direction;
at least two second teeth disposed along said second edge extending from the first surface in the first direction;
wherein said first teeth and said second teeth comprise inner and outer teeth, wherein each said outer tooth includes a peripheral portion spaced from an adjacent one of said first surface and said second surface along said axis by a distance D, each said inner tooth includes a peripheral portion spaced from an adjacent one of said first surface and said second surface along said axis by a distance d, said distance D being greater than said distance d; and
a corner tooth disposed at said first corner and a corner tooth disposed at said fourth corner, said corner teeth being unbent.

8. The blade of claim 7 wherein said second edge is without teeth near said second corner and said first edge is without teeth near said third corner.

9. The blade of claim 7 wherein said hole includes at least one flat surface.

10. The blade of claim 7 wherein said inner teeth are located closer to an adjacent end than said outer teeth are.

11. The blade of claim 7 wherein said first teeth are comprised of tabs cut from said first edge and bent in the second direction and said second teeth are comprised of tabs cut from said second edge and bent in the first direction.

12. The blade of claim 7 wherein a first transverse direction extends from said axis toward said first edge along said second surface and a second transverse direction extends from said axis toward said second edge along said first surface, said first teeth having a positive slope in said first transverse direction relative to the second surface and said second teeth having a positive slope in said second transverse direction relative to the first surface.

13. The blade of claim 7 wherein each of said first teeth and said second teeth has a trailing surface closer to the axis than to an adjacent one of said first end and said second end, and wherein each of said teeth has a leading surface closer to an adjacent one of said first end and said second end than to the axis, wherein said leading surfaces of said teeth are sharpened.

14. A generally rectangular blade comprising:
first and second ends spaced by a length of the blade, first and second surfaces extending between said first and second ends, and first and second edges extending along said length between said first and second surfaces, wherein an axis of rotation of said blade extends outwardly from said first surface in a first direction and extends outwardly from said second surface in a second direction that is opposite to said first direction;
a hole formed in said first surface and said second surface around the axis;
at least two first teeth located near said first end, wherein said first teeth are composed of tabs cut from said first edge bent to extend in the second direction;
at least two second teeth located near said second end, wherein said second teeth are composed of tabs cut from said second edge bent to extend in the first direction; and
wherein said blade includes a first corner formed by intersection of said first end and said first edge, a second corner formed by intersection of said first end and said second edge, a third corner formed by intersection of said second end and said first edge, and a fourth corner formed by intersection of said second end and said second edge, said first teeth being disposed near said first corner and said second teeth being disposed near said fourth corner,
wherein said second edge is without teeth near said second corner and said first edge is without teeth near said third corner,
a corner tooth disposed at said first corner and a corner tooth disposed at said fourth corner, said corner teeth being unbent.

15. A device comprising
a motor driven rotatable drive shaft; and
a plurality of elongated blades, each of said blades comprising:
first and second ends spaced by a length of the blade, first and second surfaces extending between said first and second ends, and first and second edges extending along said length between said first and second surfaces, wherein an axis of rotation of said blade extends outwardly relative to said first surface in a first direction and extends outwardly relative to said second surface in a second direction that is opposite to the first direction, a hole formed in said first surface and said second surface around said axis;

at least one first tooth located near said first end extending in the second direction; and at least one second tooth located near said second end extending in the first direction, wherein said blades are mounted to said drive shaft at the holes of the blades, wherein said device is adapted to penetrate the ground upon rotation of said blades by said drive shaft.

16. A method of cutting into the ground comprising:

providing an elongated blade including:

first and second ends spaced by a length of the blade, first and second surfaces extending between said first and second ends, and first and second edges extending along said length between said first and second surfaces, wherein an axis of rotation of said blade extends outwardly from said first surface in a first direction and extends outwardly from said second surface in a second direction that is opposite to said first direction, a hole formed in said first surface and said second surface around the axis;

wherein said blade includes an unbent corner formed by intersection of said first end and said first edge and an unbent corner formed by intersection of said second end and said second edge, at least one first tooth disposed along said first edge extending from the second surface in the second direction, and at least one second tooth disposed along said second edge extending from the first surface in the first direction, wherein said hole of said blade receives a drive shaft to which said blade is fastened; and driving said drive shaft to rotate said blade around the axis effective to penetrate the ground with one of said corners before one of said teeth.

17. The method of claim 16 wherein said hole includes at least one flat surface.

18. The method of claim 16 comprising penetrating material located on or in the ground with said blade.

19. The method of claim 18 said material being selected from the group consisting of grass, sod, turf, leaves, thatch and combinations thereof.

20. The method of claim 16 comprising penetrating the ground with said blade along an edge of an object located on or in the ground selected from the group consisting of a sidewalk, driveway, landscaping and combinations thereof.

21. The method of claim 16 comprising forming a trench in the ground with said blade.

22. The method of claim 21 comprising laying an article in said trench selected from the group consisting of: conduit, cable, pipe, electric pet fence wire and combinations thereof.

23. The method of claim 16 comprising fastening a plurality of said blades to said drive shaft and penetrating the ground with said plurality of blades by rotating said drive shaft.

24. The method of claim 23 wherein the holes of each of said blades includes at least one flat surface engaging a flat surface of said drive shaft.

25. A method of cutting into the ground comprising:

providing an elongated blade including:

first and second ends spaced by a length of the blade, first and second surfaces extending between said first and second ends, and first and second edges extending along said length between said first and second surfaces, wherein an axis of rotation of said blade extends outwardly from said first surface in a first direction and extends outwardly from said second surface in a second direction that is opposite to said first direction, a hole formed in said first surface and said second surface around the axis, wherein said blade includes a first corner formed by intersection of said first end and said first edge, a second corner formed by intersection of said first end and said second edge, a third corner formed by intersection of said second end and said first edge, and a fourth corner formed by intersection of said second end and said second edge, at least two first teeth disposed along said first edge and extending from the second surface in the second direction, at least two second teeth disposed along said second edge and extending from the first surface in the first direction, wherein said first teeth and said second teeth comprise inner and outer teeth, wherein each said outer tooth includes a peripheral portion spaced from an adjacent one of said first surface and said second surface along said axis by a distance D, each said inner tooth includes a peripheral portion spaced from an adjacent one of said first surface and said second surface along said axis by a distance d, said distance D being greater than said distance d, and a corner tooth disposed at said first corner and a corner tooth disposed at said fourth corner, said corner teeth being unbent;

wherein said hole of said blade receives a drive shaft to which said blade is fastened; and driving said drive shaft to rotate said blade around the axis effective to penetrate the ground with said corner teeth before said inner teeth and with said inner teeth before said outer teeth.

26. The method of claim 25 wherein said second edge is without teeth near said second corner and said first edge is without teeth near said third corner.

27. The method of claim 25 wherein said inner teeth are located closer to an adjacent end than said outer teeth are.

28. The method of claim 25 wherein said first teeth are comprised of tabs cut from said first edge and bent in the second direction and said second teeth are comprised of tabs cut from said second edge and bent in the first direction.

29. A method of cutting into a surface comprising:

providing an elongated blade including first and second ends spaced by a length of the blade, first and second surfaces extending between said first and second ends, and first and second edges extending along said length between said first and second surfaces, wherein an axis of rotation of said blade extends outwardly relative to said first surface in a first direction and extends outwardly relative to said second surface in a second direction that is opposite to the first direction, at least one first tooth located near said first end extending in the second direction, at least one second tooth located near said second end extending in the first direction, wherein said blade includes a first corner formed by intersection of said first end and said first edge, a second corner formed by intersection of said first end and said second edge, a third corner formed by intersection of said second end and said first edge, and a fourth corner formed by intersection of said second end and said second edge, wherein said first tooth is disposed near said first corner and said second tooth is disposed near said fourth corner, wherein said second edge is without any teeth near said second corner and said first edge is without any teeth near said third corner;

driving a drive shaft to rotate said blade around the axis effective to sequentially penetrate a surface with said second edge, said first tooth, said first edge and said second tooth.

* * * * *